United States Patent
Wellard et al.

(12) 
(10) Patent No.: US 6,510,219 B1
(45) Date of Patent: Jan. 21, 2003

(54) ALTERNATE NETWORK FALLBACK FOR IP TELEPHONY

(75) Inventors: Ronald R. Wellard, Kanata (CA); Kevin W. Golka, Kanata (CA); John R. Donak, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/410,122

(22) Filed: Sep. 30, 1999

(51) Int. Cl.[7] ............................................... H04M 7/00
(52) U.S. Cl. .................. 379/221.01; 379/900; 370/354
(58) Field of Search ...................... 379/114.02, 220.01, 379/221.01, 221.02, 900; 370/351, 352, 353, 354

(56) References Cited

U.S. PATENT DOCUMENTS 6,240,462 B1 * 5/2001 Agraharam et al. .... 370/238 X
6,330,316 B1 * 12/2001 Donak et al. ............... 379/196

FOREIGN PATENT DOCUMENTS

| EP | 1035719 A | 9/2000 |
| WO | 9914931 A | 3/1999 |
| WO | 0072536 A | 11/2000 |

OTHER PUBLICATIONS

A PACKET TELEPHONE GATEWAY FOR PUBLIC NETWORK OPERATORS Iss '97 World Telecommunications Congress (Internatioal Switching symposium) (Global Network Evolution convergence or Collision!Toronto –Sep. 21–26 1997 Iss./WORLD COMMUNICATIONS CONGRESS (INTERNATIONAL SWITCHING SYMPOSIUM) TORONTO, vol. 2, Sep. 21, 1997 pp. 34–44 XP0007/04453;p. 42, left–hand column; I. 19–right–hand column I. 27.

* cited by examiner

Primary Examiner—Creighton Smith
(74) Attorney, Agent, or Firm—Gibbons, Del Deo, Dolan, Griffinger & Vecchione

(57) ABSTRACT

The invention relates to methods and apparatus for switching a call from an unreliable network to an alternate network when a QoS of the network falls below a predetermined threshold. The invention includes a telephone call switching apparatus which monitors the QoS of the call. When the QoS of the call falls below a first threshold the switching apparatus establishes a connection over an alternate network. If after a predetermined time period or after the QoS falls below another predetermined threshold the call is transferred to the alternate network connection. While the switching apparatus is maintaining multiple network connections, the idle network connection remains muted.

22 Claims, 3 Drawing Sheets

ALTERNATE NETWORK FALLBACK FOR IP TELEPHONY

FIELD OF THE INVENTION

The present invention relates generally to telephony and more particularly to customer premise switching equipment with the ability to route calls over unreliable networks such as the Internet and to transparently switch to an alternate route during a telephone call when a quality of service of the unreliable network falls below a predetermined threshold.

BACKGROUND OF THE INVENTION

Support for end-to-end voice calls using Internet Protocol ("IP") networks such as the Internet as an alternative to traditional public switched telephone networks ("PSTN") is well known. Unlike the PSTN, which is circuit-switched, the Internet is packet-switched (i.e., communication on the Internet is accomplished by transmitting and receiving packets of data). In addition to data, each packet contains a destination address to ensure that it is routed correctly. The format of these packets is defined by the IP. One type of allowable data is encoded, digitized voice, termed voice over IP (VoIP). VoIP is voice that is packetized as defined by IP, and communicated over the Internet for telephone-like communication. Individual VoIP packets may travel over different network paths to reach the final destination where the packets are reassembled in correct sequence to reconstruct the voice information.

While transmission over the Internet is inexpensive relative to transmission over the PSTN, the Internet poses problems which are not present in the PSTN. In particular, the transmission speed between any two users can change drastically due to the dynamic number of users sharing the common transmission medium, their bandwidth requirements, the capacity of the transmission medium, and the efficiency of the network routing and design. Other problems associated with VoIP are the variability of the quality of the signal received at the destination (i.e. the number of transmission errors such as packet loss, packet delay, corrupted packets, etc.). Thus, while the Internet may be a suitable medium for voice communications the suitability is not consistent. Thus, in the event a quality of service (QoS) of the transmission falls below acceptable levels it would be advantageous to be able to switch to a different network in a way that may be transparent to the parties speaking.

Many businesses employ customer premise switches ("CPS") (e.g. Key Signaling Units ("KSU"), Private Branch Exchanges ("PBX"), Centrexes or the like) for routing calls. Further, with the growing popularity of the home office, many private homes are installing customer premise switches. In addition to routing calls through the PSTN, many of these CPS route calls through unreliable networks such as the Internet, Frame Relays, wireless networks and the like. When an end-user makes a call, the digits dialed are parsed based upon pre-configured tables which indicate which communication interfaces are to be employed for the call attempt (i.e. PSTN, Internet, wireless networks, other IP networks, etc.).

Systems currently exist which monitor the in-call QoS of an unreliable network to determine if an alternate communication path should be chosen. However, such systems either require the conversing parties to terminate the call and re-dial or they are slow and disrupt the call with voice prompts such as "please wait while your call is re-connected."

Accordingly, there exists a need for a CPS for routing calls, which has access to multiple networks including at least one unreliable network, which can determine a QoS of the unreliable network while a call is in progress and transfer the call to a different network in a way that may be transparent to the call participants.

SUMMARY OF THE INVENTION

The present invention provides methods and apparatus for a CPS to transfer a telephone call which is taking place over an unreliable network to a different network.

An embodiment of the invention includes a method of rerouting a call over an alternate network including monitoring a Quality of Service (QoS) of a network connection between at least two points and establishing a network connection between the at least two points over an alternate network when the QoS of the network connection falls below a threshold. The method further includes switching to the alternate network connection subsequent to establishing the alternate network connection.

Another embodiment of the invention includes an apparatus for rerouting a call over an alternate network. The apparatus include a monitoring module for monitoring a Quality of Service (QoS) of a network connection between at least two points. It also includes a connection module for establishing a network connection between the at least two points over an alternate network in response to the monitoring module determining that the QoS has fallen below a threshold. The apparatus further includes a switching module for switching to the alternate network connection subsequent to the connection module establishing the alternate network connection.

Another embodiment of the invention includes a switching apparatus which includes a monitor configured to monitor a Quality of Service (QOS) of a connection between the switching apparatus and a remote switching apparatus. The apparatus also includes a routing table and a routing engine coupled to the monitor. The routing engine is capable of accessing the routing table and establishing an alternate path between the switching apparatus and the remote switching apparatus without disconnecting the original connection.

DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

The present invention provides methods and apparatus for a customer premise switch (CPS)to transfer established telephone calls from one network to a different network. The CPS monitors the network while a telephone call is in progress to determine a Quality of Service (QoS) of the network. If the QoS of the network drops below a first predetermined threshold, then the CPS establishes a connection over an alternate network while maintaining the original connection. If, after falling below the first threshold, the QoS falls below another predetermined threshold then the CPS transfers the call to the alternate network connection. At this point the CPS may (i) discontinue monitoring the QoS of the network connection but still maintain both connections until the call is terminated, (ii) drop the original connection, (iii) maintain the original connection, continue to monitor the QoS of the original connection, and transfer the call back to the original connection if the QoS rises above one or both of the thresholds (depending upon design choices) or (iv) drop the original connection and monitor the QoS of the second connection in the event that the connection needs to be routed over another network. If the call is transferred back to the original connection, it is also possible, but not required that the second connection be terminated if the QoS rises above the first predetermined level.

In an alternate embodiment, when the QoS falls below the first threshold, a timer is set and the call is transferred to the alternate network a predetermined time period after falling below the first threshold,. thus removing the need for the second threshold. The only requirement for the time period is that it must be long enough for the alternate network connection to be established. It is also possible to combine the two embodiments such that if the QoS falls below a second threshold before the predetermined time period is finished the call could be transferred prior to the time period.

Figure 1:
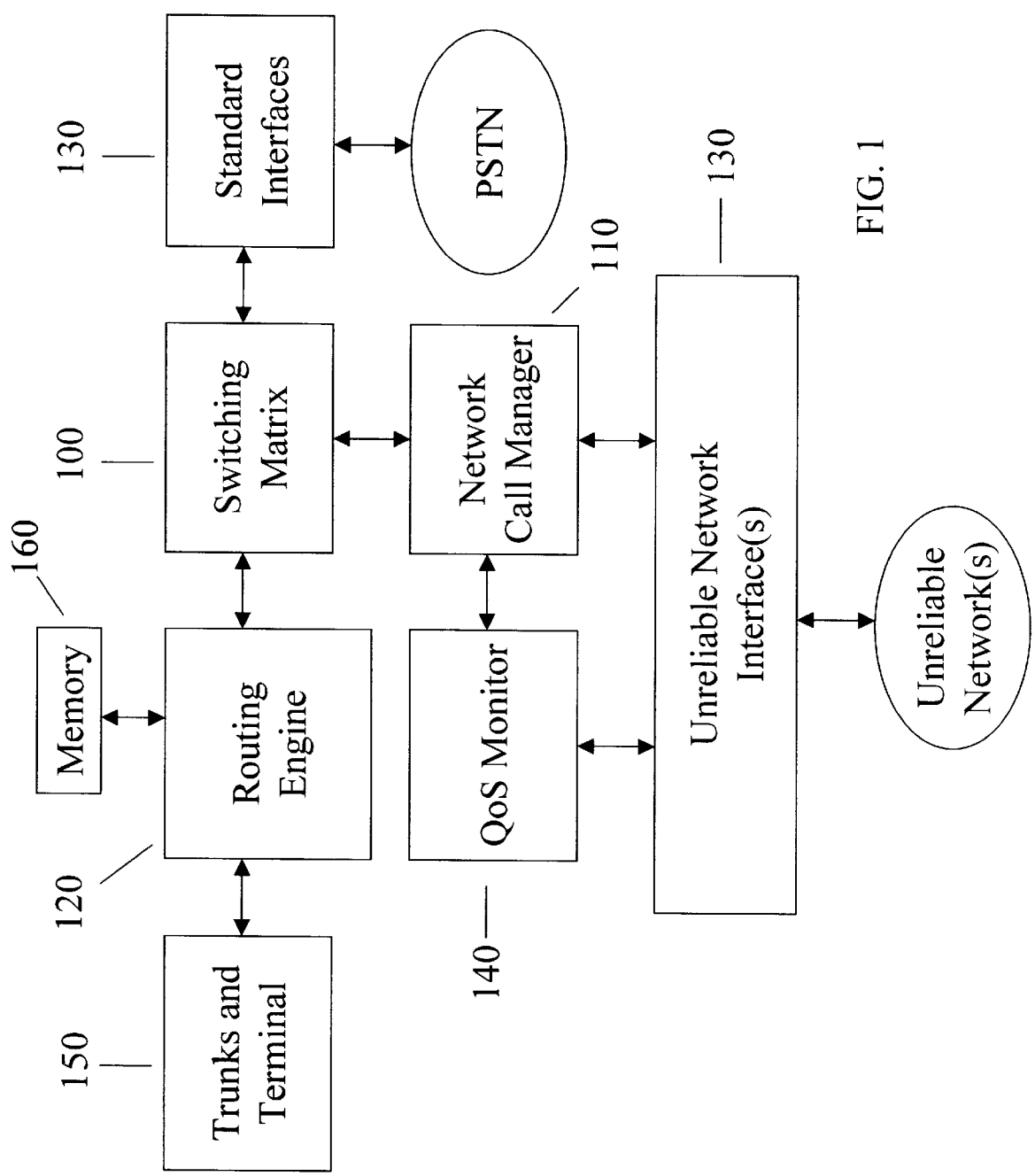
FIG. 1 is a block diagram of an embodiment of the invention.

FIG. 1 illustrates an embodiment of the present invention. One or more terminals and trunk lines 150 are connected to the CPS (e.g. a PBX, Centrex, KSU or the like). Hereafter, any reference to trunk lines 150 or terminals 150 is intended to refer to either or both. The terminals 150 can make and receive telephone calls. The CPS includes a routing engine 120 connected to a switching matrix 100. Routing engine 120 supports alternate routing through the use of primary and secondary tables. Least cost routing is a form of alternate routing which can be realized through the use of these tables. The routing engine 120 may be connected through switching matrix 100 to various interfaces for connecting to various networks (e.g. standard interfaces for connecting to the PSTN, etc). One or more such interfaces may include a call manager 110 for connecting the call to the unreliable network (e.g. the Internet, some other IP network, a frame relay, a wireless network or some other network capable of carrying voice which has variable QoS). Those skilled in the art will recognize that a call manager 110 may also be used to connect the call to a reliable network. The call manager 110 may be an adjunct to the CPS or it may be integral therewith. The call manager 110 includes a QoS monitor 140 which may be integral therewith or an adjunct thereto.

In operation, the routing engine 120 receives a telephone call (180 in FIGS. 2 and 3), including a destination code from a terminal or trunk line 150. Based upon the destination code, the routing engine 120 determines the primary interface choice 130 for the call. If the primary choice 130 is determined to be an unreliable network then the routing engine 120 sends a message to the call manager 110 to monitor the QoS of the unreliable network during the telephone call. The message includes the destination code and the QoS requirements of the call. Those skilled in the art will recognize that the message does not need to include the QoS requirement if a general QoS minimum requirement is set for all telephone calls (e.g. an earlier message could inform the QoS monitor 140 of the QoS requirements, the QoS requirement could be configured into the QoS monitor 140, or it could be configured into the call manager 110, etc.). In a configuration such that a message is employed to inform the QoS monitor 140 of the general QoS requirements, the QoS requirements may only need to be sent one time to the QoS monitor 140.

During call setup, the CPS at the calling station may need to communicate with the CPS at the destination station to negotiate various parameters such as: determining if the destination has a CPS, determining if the destination CPS is compatible with the calling station CPS for purposes of switching the call to another network, determining common first and second threshold QoSs, determining available alternate networks in the event the QoS falls below the QoS thresholds, determining which of the available alternate networks to employ (e.g., the alternate network could be determined by least cost routing, by default or any other method and could be a reliable network or another unreliable network.), in which order to utilize the available networks, etc. This communication may be performed prior to connecting the call or during the call and may be performed in-band or out-of-band. It is also possible that the CPSs are not capable of reaching agreement in which case the feature could be turned off for the call or the call may be disconnected. Those skilled in the art will recognize that one or more of these determinations may be configured into the switch (i.e. the QoS thresholds may be standard thresholds for all CPSs, the alternate network may always be the same network (e.g. the PSTN, a wireless network, etc.), what to do in the event of no agreement, etc.).

The QoS monitor 140 monitors the QoS of the network during the telephone call (190). If the actual QoS remains above a predetermined $1^{st}$ threshold then QoS simply continues to monitor the network (200). If however, the QoS falls below the $1^{st}$ threshold then the QoS monitor 140 continues to monitor the network and signals the call manager 110 to establish a connection to the same destination via an alternate network (210). If an alternate network is available, the CPS may indicate the same to the terminal or trunk line 150 (although not required). If for some reason no alternate network is available, the CPS could (i) continue to search for one, (ii) provide the terminal with the option of maintaining the current connection while continuing to search for an alternate route, (iii) provide the terminal with the option of maintaining the current connection while ending the search for an alternate route, or (iv) terminate the current connection altogether. Those skilled in the art will recognize that if no alternate network is available the CPE may or may not need to communicate that information to the remote CPS and if an alternate network becomes available the CPS may or may not need to check with the remote CPS to determine if the alternate network is available and acceptable to the remote CPS.

Figure 3:
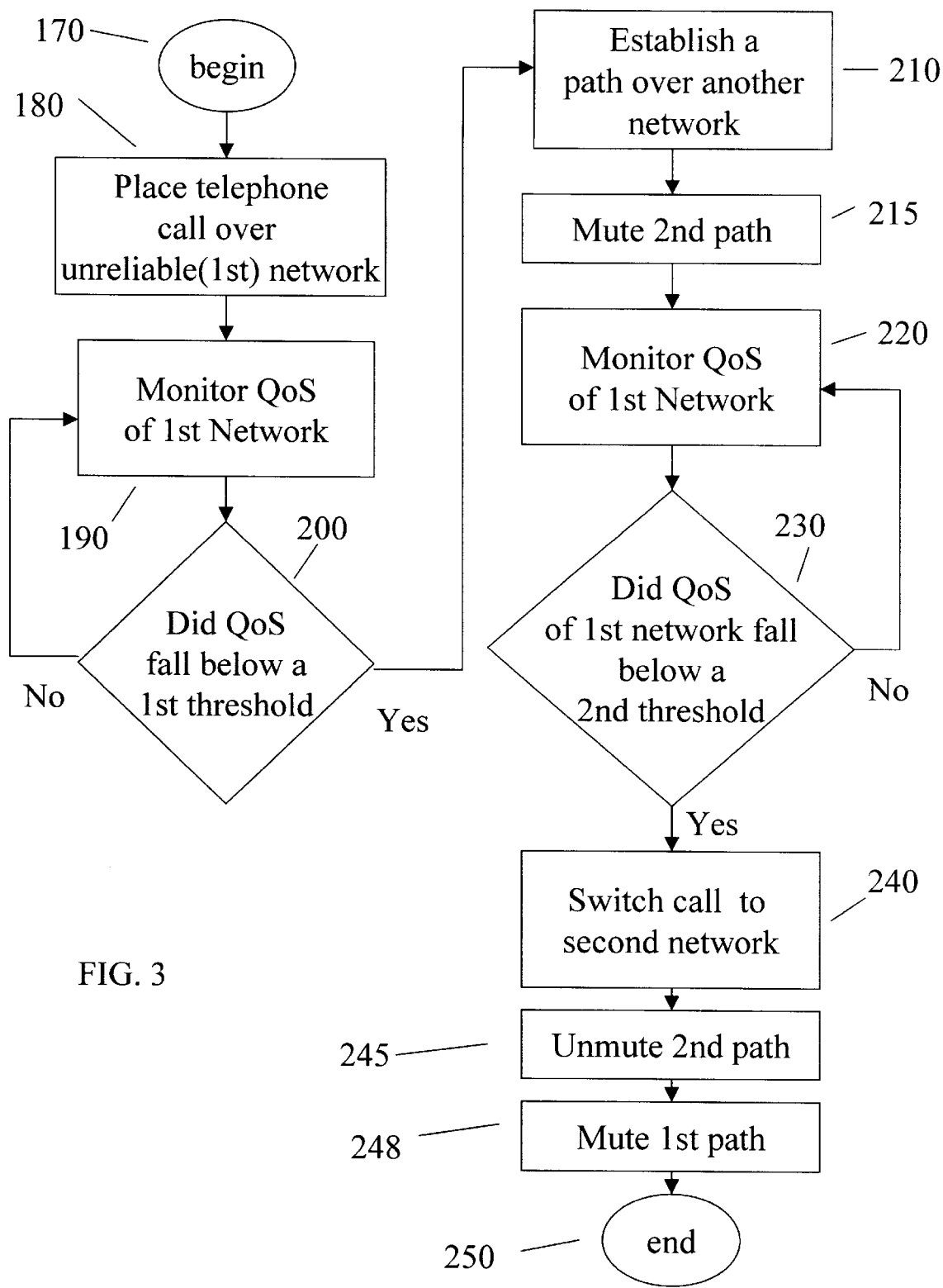
FIG. 3 is a flow diagram of another embodiment of the invention.

While the call is still in progress over the original network, the connection established over the alternate network is preferably entirely muted (215 in FIG. 3). However, it is possible that the connection is only partially muted (215 in FIG. 3). Since maintaining more than one telephone connection is well known (although not between the same end points) the manner of maintaining the multiple connections will not be discussed further herein.

If while the CPS is monitoring the QoS of the connection (220) and maintaining the two connections the QoS falls below the $2^{nd}$ threshold (230), the CPS will unmute the muted connection (245), switch the call from the first network to the second (240) and mute the first connection (248). Coordination of the CPSs to minimize the differential timing of this operation can be done using an in-band tone signal sent back from the destination system as an acknowledgment of priming fallback and removal of the tone to initiate the fallback connection, or the tone itself could be used to initiate the fallback, or any other synchronization technique may be employed. A hysteresis mechanism may be employed to prevent thrashing. Those skilled in the art will recognize that synchronization, while preferable, is not required. The system could be set to change one side then the other or it could be set up such that each party must manually switch to the other connection. In such an embodiment, the CPS would merely indicate to the parties that the QoS has fallen below the second threshold and thus give the parties the choice of remaining with the current connection or manually switching to the second connection (e.g. by depressing a button on the phone or by causing a hook-flash etc.).

While the present invention has been described in relation to only a primary and secondary routing choice, it is possible for additional choices to be programmed into the CPS. In a configuration which includes additional routing choices after the secondary choice, it is possible for the secondary choice to be another unreliable network in which case the above described procedures may be applied to the second connection. It is also possible that instead of deciding to route the call to an alternate network, the routing engine 120 could be configured to inform the calling party that there is no available network for routing the call.

Those skilled in the art will recognize that the present invention may be employed with three way calling or conference calls. In such a situation, if the party providing the connection between the other parties has sufficient connections available, each connection could be monitored and switched to an alternate network connection without affecting the other connections or when one connection changes to another network, all connections change to that network. When all connections change to the alternate network, they can change simultaneously or systematically depending upon the availability of extra connections to the CPS providing the connection between the parties.

Figure 2:
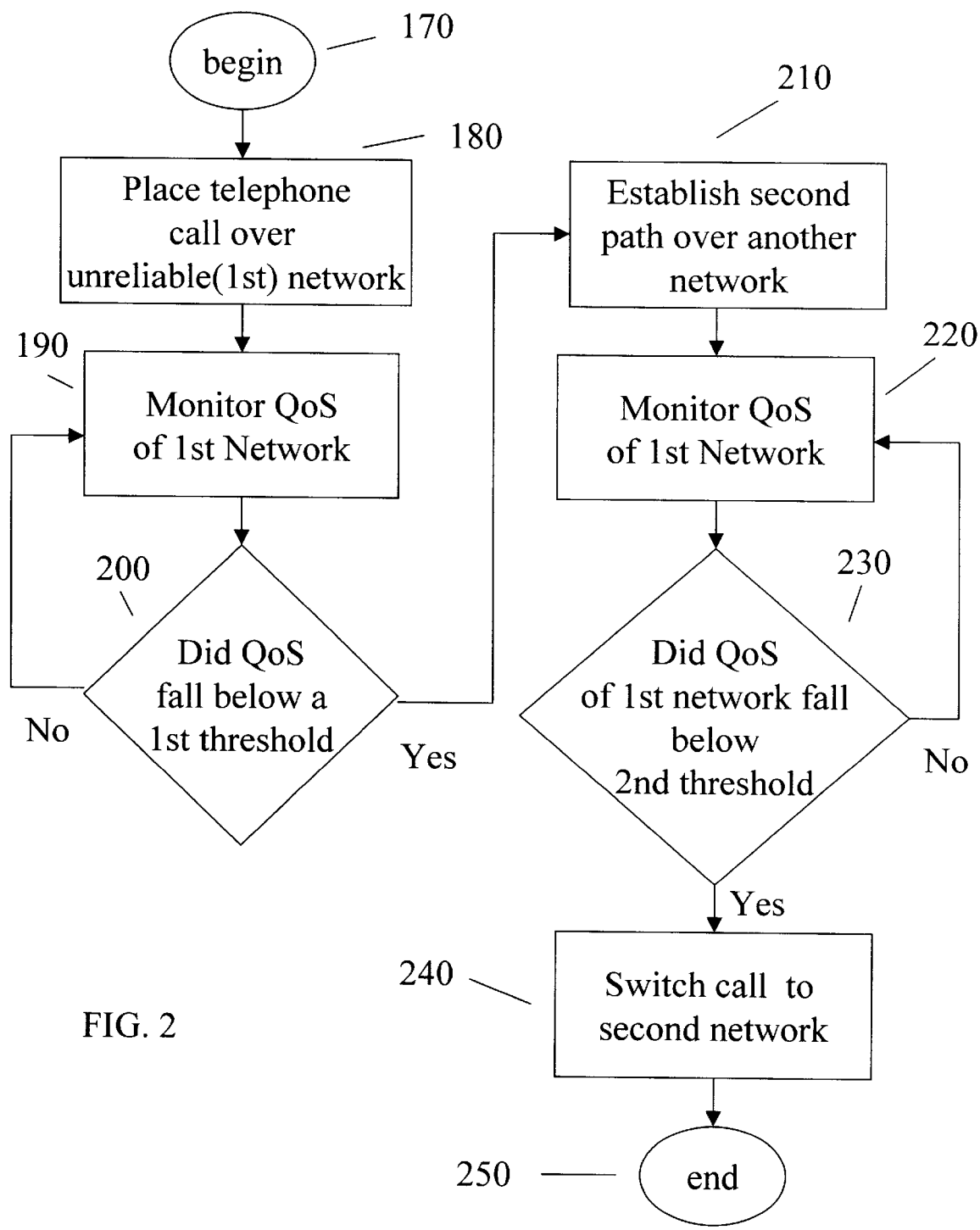
FIG. 2 is a flow diagram of an embodiment of the invention.

It will thus be seen that the invention provides methods and apparatus for monitoring a QoS of an unreliable network, determining if the monitored QoS is sufficient for a particular telephone call and rerouting the call if the QoS becomes insufficient. Those skilled in the art will appreciate that FIGS. 1–3 illustrate such methods and apparatus.

It will be understood that changes may be made in the above construction and in the foregoing sequences of operation without departing from the scope of the invention. For example, the system could be configured to give the users the option of maintaining the current network connection or changing to the alternate network, the change to the alternate network connection could be manual (e.g. by depressing a button or causing a hook-flash) or automatic, the users could be given the option to prevent the switch to the alternate network (e.g. by depressing a button, etc.), the user could have the option of turning the feature on or off on a per call basis, etc. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of rerouting a call over an alternate network comprising:

monitoring a Quality of Service (QoS) of a network connection between at least two points, establishing a network connection between said at least two points over an alternate network subsequent to said QoS falling below a threshold; and, switching to said alternate network connection subsequent to said establishing said alternate network connection.

2. The method of rerouting a call according to claim 1 wherein:

said switching to said alternate network connection occurs subsequent to said QoS falling below another threshold.

3. The method of rerouting a call according to claim 1 wherein:

said switching to said alternate network connection occurs a predetermined amount of time subsequent to said QoS falling below said threshold.

4. The method of rerouting a call according to claim 1 further comprising:

ending said network connection subsequent to said switching.

5. The method of rerouting a call according to claim 1 further comprising:

monitoring a QoS of said another network connection.

6. The method of rerouting a call according to claim 5 further comprising:

ending said network connection subsequent to said switching;

establishing a network connection between said at least two points over another alternate network when said QoS falls below said threshold; and, switching to said another alternate network connection subsequent to said QoS of said alternate network falling below said threshold.

7. The method of rerouting a call according to claim 1 further comprising:

switching back to said network connection subsequent to said QoS of said network rising above said threshold.

8. The method of rerouting a call according to claim 2 further comprising:

switching back to said network connection subsequent to said QoS of said network rising above said another threshold.

9. The method of rerouting a call according to claim 1 wherein:

said switching is performed by providing a signal at one or more of the points.

10. The method of rerouting a call according to claim 1 wherein:

said switching is simultaneous at both points.

11. The method of rerouting a call according to claim 1 wherein:

muting said alternate network connection prior to said switching; and, muting said network connection subsequent to said switching.

12. The method of rerouting a call according to claim 11 further comprising:

unmuting said alternate network connection subsequent to said switching.

13. The method of rerouting a call according to claim 11 further comprising:

unmuting said alternate network connection prior to said switching.

14. An apparatus for rerouting a call over an alternate network comprising:
- monitoring means for monitoring a Quality of Service (QoS) of a network connection between at least two points;
- connection means for establishing a network connection between said at least two points over an alternate network in response to said monitoring means determining that said QoS has fallen below a threshold; and,
- switching means for switching to said alternate network connection subsequent to said connection means establishing said alternate network connection.

15. The apparatus according to claim 14 wherein:
said switching means switching to said alternate network connection in response to said monitoring means determining that said QoS has fallen below another threshold.

16. The apparatus according to claim 14 wherein:
said switching means switching to said alternate network connection a predetermined amount of time subsequent to said QoS falling below said threshold.

17. The apparatus according to claim 14 further comprising:
- disconnection means for disconnecting said network connection subsequent to said switching means switching to said alternate network connection.

18. The apparatus according to claim 14 wherein:
- said monitoring means is capable of monitoring a QoS of said another network connection;
- said connection means is capable of establishing a network connection between said at least two points over another alternate network in response to said monitoring means determining that said QoS of said another network has fallen below said threshold; and,
- said switching means is capable of switching to said another alternate network connection subsequent to said connection means establishing said another alternate network connection.

19. The apparatus according to claim 14 wherein:
said switching means is capable of switching back to said network connection subsequent to said monitoring means determining that said QoS of said network has risen above said threshold.

20. The apparatus according to claim 15 wherein:
said switching means is capable of switching back to said network connection subsequent to said monitoring means determining that said QoS of said network has risen above said another threshold.

21. A switching apparatus comprising:
- a monitor configured to monitor a Quality of Service (QOS) of a connection between said switching apparatus and a remote switching apparatus;
- a routing table; and,
- a routing engine, coupled to said monitor, capable of accessing said routing table and establishing an alternate path between said switching apparatus and said remote switching apparatus without disconnecting said connection.

22. The switching apparatus according to claim 21 wherein:
said routing engine is capable of switching from said connection to said alternate path.

* * * * *